United States Patent [19]

Inoue et al.

[11] 4,219,601
[45] Aug. 26, 1980

[54] RUBBER REINFORCING MEMBER AND A METHOD OF MANUFACTURING THE SAME

[75] Inventors: Osamu Inoue; Masaru Abe, both of Sayama; Koji Chiba, Higashiyamato; Isao Miyoshi, Kodaira, all of Japan

[73] Assignee: Bridgestone Tire Company Limited, Tokyo, Japan

[21] Appl. No.: 954,029

[22] Filed: Oct. 23, 1978

[30] Foreign Application Priority Data

Oct. 28, 1977 [JP] Japan .................. 52-128744

[51] Int. Cl.² ............... D03D 13/00; D02G 3/00; B32B 31/00; B29C 19/00
[52] U.S. Cl. ................... 428/222; 428/114; 428/295; 428/371; 156/304.1; 156/266; 156/269;
[58] Field of Search .......... 428/114, 222, 295, 371; 156/148, 180, 181, 264, 266, 269, 304

[56] References Cited

U.S. PATENT DOCUMENTS

| 3,047,446 | 7/1962 | Henson | 428/222 |
| 3,273,978 | 9/1966 | Paul | 428/222 |
| 3,700,012 | 10/1972 | Alderfer | 428/222 |
| 3,778,329 | 12/1973 | Alderfer | 428/295 |
| 3,888,713 | 6/1975 | Alderfer | 156/181 |

*Primary Examiner*—William R. Dixon, Jr.
*Attorney, Agent, or Firm*—Sughrue, Rothwell, Mion, Zinn and Macpeak

[57] ABSTRACT

A rubber reinforcing member and a method of manufacturing the same are disclosed. The rubber reinforcing member is composed of rubber and a number of filamentous elements embedded therein. The filamentous element is formed of a metal or a material having a strength similar to that of the metal and has a helix on at least one end portion thereof.

9 Claims, 17 Drawing Figures

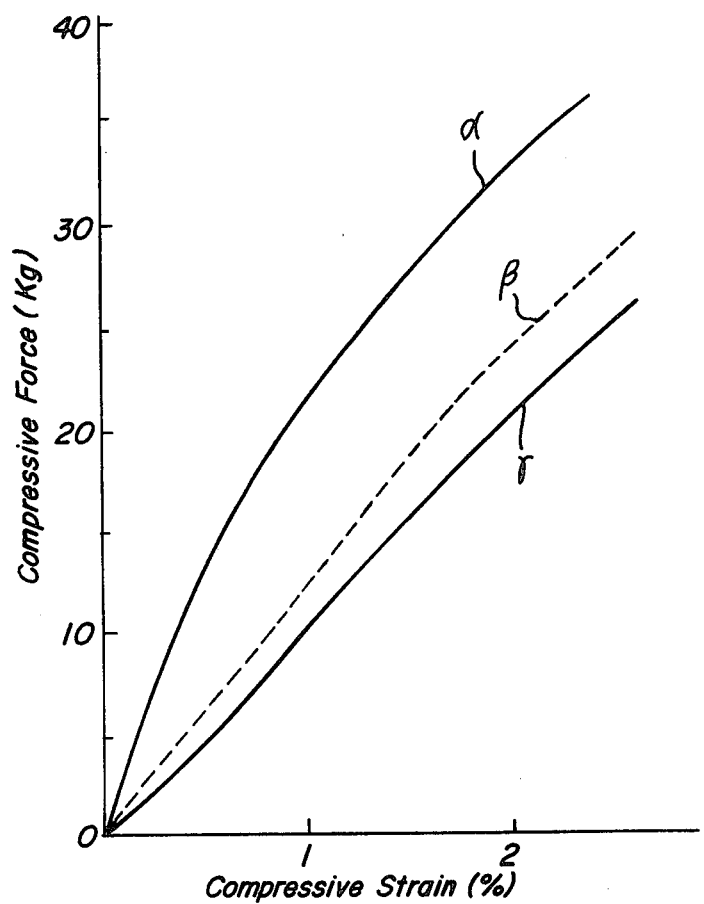
FIG._1
FIG._2a
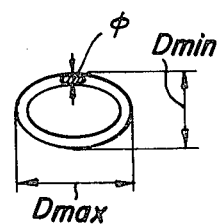
FIG._2b

FIG_12a
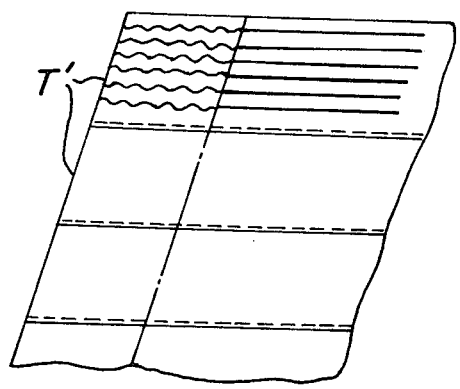
FIG_12b
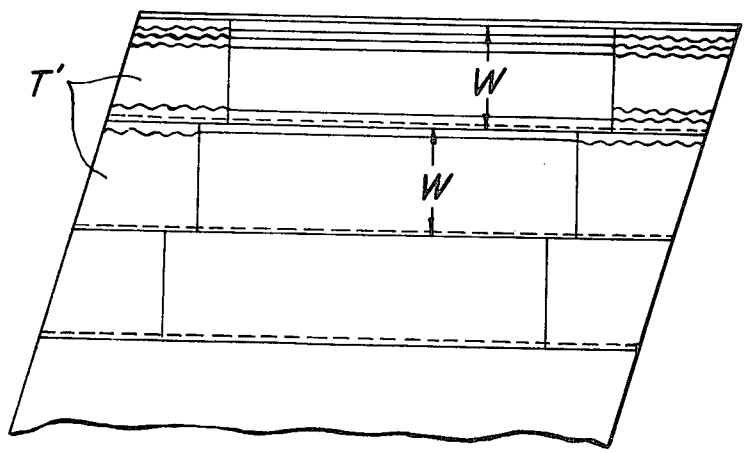

RUBBER REINFORCING MEMBER AND A METHOD OF MANUFACTURING THE SAME

This invention relates to a rubber reinforcing member and a method of manufacturing the same by advantageously utilizing wires or filaments of a metal or a material having a strength close to that of the metal such as iron or copper alloy and other common metals, which are suitable for rubber reinforcement, and organic fibers such as Cablar (trade name, made by Du Pont de Nemours E.I.) having a strength fairly close to that of the metal and the like. More particularly, the invention relates to a rubber reinforcing member suitable for use as a reinforcing element in a framework or core structure of rubber products such as pneumatic tires for vehicles, conveyor belts, rubber crawlers and the like.

Recently, the use of metal cords, particularly brass-plated steel cords has been generally recognized for the reinforcement of rubber products. In fact, these cords are widely used as bead core and other reinforcing elements in the field of industrial goods, especially tires for vehicles.

In case of the conveyor belt, the steel cord is primarily used as a tension-resistant core member and further contributes to improve the wear resistance, thermal resistance and strength of the belt. Similarly, the use of the steel cord as the tension-resistant member for the rubber crawler results in the improvement of the strength and tension resistant property. Furthermore, the steel cord is used in a carcass, a breaker or a belt of tires for improving the cut resistant property, wear resistance, durability, cornering stability and dimensional stability and reducing the number of plies and as a chief for improving the rigidity and resistance to rim friction of the bead portion. In either event, the use of the steel cord as a reinforcing member or a stabilizing member is a necessity in the tire industry because the steel cord offers numerous merits which have never been obtained by using a reinforcing member composed of organic fiber cords conventionally used.

However, the metal cord should not be overlooked in terms of an inherently fatal demerit though it is intended to widely extend the use of the metal cord. In fact, this drawback is a cause of obstructing a satisfactory development of performance inherent to the metal cord.

Namely, when the metal cords are embedded in rubber as a rubber reinforcing element, an extreme stress concentration is caused at a portion bonded to rubber, particularly at an end portion of the metal cord under severe service conditions as used in the tire due to the great difference in the modulus of elasticity between the metal cord and the rubber body. This often results in a peeling off from the rubber body or a separation between the end of the metal cord and the rubber body. In order to prevent the occurrence of the separation, there have hitherto been adopted only temporary measures, for example, an improvement of adhesion strength at the end portion of the reinforcing member, so that a fundamental solution has not yet been achieved.

According to the invention, the above mentioned drawbacks in the rubber reinforcing member of this type can completely be eliminated by reducing the modulus of elasticity at an end portion of a filament element acting as a reinforcing member, whereby the strong reinforcing effect of such an element can effectively be utilized.

Now, the separation mainly results from the fact that fatigue failure is easily induced at a boundary between the end of the steel cord and the rubber by shearing stress and strain accompanied with a shearing load generated between the steel cord and the rubber body because the brass plating formed on the outer surface of the steel cord for effectively improving the adhesion to rubber is lacking in the cut surface of the steel cord end. Further, another cause of the separation phenomenon is an extension of the separation caused by a repeatedly picking action of the steel cord end, which transmits the overall strain generated in the reinforcing member to the end of the steel cord.

The invention is directed to fundamentally prevent the occurrence of separation based on the results of investigation relating to the separation phenomenon at the end portion of filamentous reinforcing elements, a typical example of which is steel cord as mentioned above.

That is, according to the invention, it has been found that the rubber reinforcing element is composed of a filament of a metal or a material having a strength close to that of the metal, or a non-twisted or twisted bundle of such filaments (hereinafter referred to as a filamentous element), in which at least one end portion, preferably both end portions of the element exhibits a helical form and has an axial compression modulus of elasticity smaller than that at its remaining central portion, preferably 1/10 to ⅔ of the axial compression modulus of elasticity at the central portion. Hence, the difference in the compressive modulus of elasticity between the end portion of the filamentous element and the rubber body is advantageously mitigated to prevent the occurrence of the strong shearing stress and strain at that end portion. At the same time the strain generated over the rubber reinforcing member is effectively absorbed at that end portion to reduce the picking action of the filamentous element. As a result, the separation can advantageously be prevented without substantially diminishing the reinforcing effect of the filamentous element.

Therefore, the invention provides a rubber reinforcing member serving as a reinforcement for various rubber products, which is obtained by arranging a great number of the filamentous elements in parallel and embedding them in rubber to form a rubberized fabric of a so-called tire cord structure.

In the rubber reinforcing member according to the invention, a single filament having a helically formed portion on at least one end thereof may be used as the filamentous element. Preferably, the filamentous element is composed of a non-twisted or twisted bundle obtained by assembling a great number of single filaments together, wherein the helix may be formed before or after the assembling of these filaments. In any case, the rubber reinforcing member according to the invention is manufactured by arranging a great number of the filamentous elements in parallel and coating them with rubber in the form of a tire cord fabric. Any filamentous elements can be used independently of their cross section and as the material for element, steel wire and other metal wires like the steel cord or organic fiber material such as Cablar may be used.

When the rubber reinforcing member according to the invention is used as a tension-resistant core body for conveyor belt or rubber crawler, the endless bonding is conducted at both ends of the rubber reinforcing member as follows; that is, the helically formed portions at both ends of the filamentous element are located along the rectilinear portion of the filamentous element so as not to overlap the helically formed portions with each other as far as possible. Alternatively, the opposed helically formed portions abut with each other to form an abutted region and an auxiliary element is arranged along the abutted region. The auxiliary element is composed of a center rectilinear portion, whose length is slightly longer than the total length of the helically formed portions in the abutted region, and helically formed portions provided at both ends of the center rectilinear portion. In either event, the separation phenomenon at the end portion of the core body can advantageously be avoided.

In case of utilizing the rubber reinforcing member according to the invention as, for example, a radial carcass of tires for vehicles, a great number of the filamentous elements are formed into helixes at both ends thereof the width required for the carcass and after they are arranged side by side, rubber coating is conducted to form a rubberized fabric. Thus, when a great number of the filamentous elements are continuously drawn out side by side while intermittently forming helical regions every the required width and embedded in rubber to form a rubberized fabric. Then the fabric is cut every the helical regions into a great number of the fabric strips, if the width of the rubber coating in the strip reaches the circumferential length of the carcass, the strip may be used for the carcass at it is. However, it is often difficult to produce the strips having a width equal to the circumferential length of the carcass by means of the conventionally used production equipment. In this case, side edges of each strip are successively bonded with each other after the cut ends at the helical region of the strips are aligned with each other, whereby a rubber reinforcing member having a length sufficient to use as the carcass can be obtained.

Moreover, when the rubber reinforcing member according to the invention is used as a bias carcass or breaker and belt which are usually made into the bias structure, it is convenient that the width of the rubber coating in the rubberized fabric is reduced together with the number of the filament elements embedded therein. Also, the rubberized fabric is obliquely cut at the helical region, having a length being slightly made longer at an interval corresponding to a bias angle of the reinforcing member, into a plurality of fabric strips and then side edges of the strips are successively bonded with each other after the cut ends of the strips are aligned with each other so as to obtain the reinforcing member having a length corresponding to the circumferential length necessary for such application.

BRIEF DESCRIPTION OF THE DRAWINGS

The invention will now be described in greater detail with reference to the accompanying drawings, wherein:

FIG. 1 is a graph illustrating a comparison of various filamentous elements in the compressive modulus of elasticity;

FIG. 2a is a side elevation of a helix formed on the filamentous element using in the rubber reinforcing member according to the invention;

FIG. 2b is its end view showing an outer contour projected on a plane perpendicular to the axial direction of one pitch of the helix shown in FIG. 2a;

FIGS. 11, 12a and 12b are plan views of various embodiments of a band-shaped reinforcing material obtained by joining bias cut strips of the rubber reinforcing member according to the invention with each other, respectively.

DESCRIPTION OF THE PREFERRED EMBODIMENT

Figure 3:
FIGS. 3 to 8 are diagrammatical views showing various embodiments of the filaments element according to the invention, respectively.

From the following experiment, it can be seen that the axial compression modulus of elasticity of the rubber reinforcing member according to the invention is gradually allowed to come near that of the rubber body under an influence of the presence of the helically formed filaments embedded therein.

The term "axial compression modulus of elasticity" of the filamentous element used herein means a value calculated according to the following equation on a basis of the relation between compressive strain and compressive force when the filamentous element is embedded in the center of a columnar vulcanized rubber body having a diameter of 30 mm and a height of 50 mm and then compressed under pressure:

$$\text{Axial compression modulus of elasticity} = \frac{(\frac{F-f}{S})}{\epsilon} \text{ (kg/mm}^2\text{)}$$

wherein; F is a compressive force (kg) at the compressive strain of 1%, f is a compressive force (kg) when a vulcanized rubber body having the same size and shape and embedding no filamentous element therein shows a compressive strain of 1%, S is a sectional area (mm$^2$) of the filaments element and $\epsilon$ is a compressive strain of 1% (1/100).

In FIG. 1 are shown compression test results $\alpha$, $\beta$ and $\gamma$ illustrating the relation between compressive strain and compressive force with respect to the following three specimens a, b and c. The specimen a is composed of a rubber lump, particularly a columnar rubber body having a diameter of 30 mm and a height of 50 mm, and a rectilinear stranded steel cord embedded in the center of the lump as a reinforcing element and having a strand construction of 1×5, filament diameter $\phi$ of 0.25 mm and cord diameter d of 0.68 mm. The specimen b is composed of the same rubber lump as described above containing a reinforcing element embedded therein, the reinforcing element being obtained by bundling 5 helically formed filaments each having a diameter $\phi$ of 0.25 mm, average diameter D of an outer contour projected on a plane perpendicular to the axial direction of one pitch of the filament of 0.95 mm, Dmax/Dmin=1.25, D/$\phi$=3.8 and pitch of 10.5 mm so as to provide a strength substantially equal to that of the steel cord for the comparison with the specimen a. The specimen c is composed only of the rubber lump as described above. It is a matter of course that the rubber of all of these specimens is of the same rubber compound.

As can be seen from FIG. 1, the result β for the helically formed reinforcing element b becomes substantially close to the result γ for the rubber specimen c and fairly mitigates the great difference α-γ between the steel cord a and the rubber lump c. On the other hand, it is expected that a reinforcing element obtained by bundling rectilinear steel cord filaments without twisting exhibits an axial compression modulus of elasticity fairly larger than that of the steel cord a.

With the foregoing in mind, according to the invention, a helix is formed on at least one end portion of the filamentous element, whereby the difference of the axial compression modulus of elasticity between that end portion and the rubber body is advantageously mitigated and hence the occurrence of separation phenomenon can effectively be avoided.

In FIGS. 2a and 2b is shown a configuration of a helically formed portion in the filamentous element according to the invention. The ideal shape of an outer contour projected on a plane perpendicular to the axial direction of one pitch of the helically formed portion should be a true circle for the purpose of equalizing the stress subjected to it. However, it is very difficult in technique to obtain such true circle and also it is unavoidable to cause some deformation in the steps for incorporating the filamentous element as a rubber reinforcing member into a rubber product. In view of production demands, the following deviations from the true circle may be allowed to put into practical use, so that such allowable deviations are involved within a scope of the invention.

That is, a ratio Dmax/Dmin of a maximum diameter (Dmax) of the outer contour projected on a plane perpendicular to the axial direction of one pitch of the helically formed portion to a minimum diameter (Dmin) thereof lies within a range of 1.0 to 1.5 and an average diameter $$D( = \frac{D_{max} + D_{min}}{2} )$$

lies within a range of (2.0~20)φ, preferably (3~15)φ, φ being the diameter of the filamentous element.

According to the invention, the above mentioned steel cord a may be used as a helical cord by directly forming it into a helix. In this case, the ratio of the maximum diameter to the minimum diameter (Dmax/Dmin) in the outer contour of the helical cord is within a range of 1.0 to 1.5 and the average diameter $$D( = \frac{D_{max} + D_{min}}{2} )$$

is within a range of (1.1~12)d, preferably (1.1~10)d, d being the diameter of the cord.

In FIGS. 3 to 8 are shown specific embodiments of the filamentous element applicable to the invention, respectively.

FIG. 3 shows an embodiment of the filamentous element composed of a single filament having at both ends helically formed portions, each of which having a diameter φ of 0.25 mm, average diameter D of 1.25 mm and pitch of about 10.5 mm. In this embodiment, the single filament having a diameter φ of 0.1 to 1.0 mm, preferably 0.13 to 0.5 mm may be used.

Figure 4:
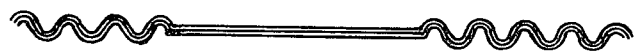

FIG. 4 shows a modified embodiment of the filamentous element, i.e. the element is composed of a bundle obtained by assembling three filaments, each having a diameter φ of 0.25 mm and helically formed portions at both ends, together without twisting. In this embodiment, the diameter φ of the filament is within a range of 0.1 to 1.0 mm, preferably 0.13 to 0.5 mm and the number of filaments bundled is preferably not more than 50.

Figure 5:

FIG. 5 shows an embodiment of the filamentous element composed of a single filament formed into helix over its whole length wherein the pitch and average diameter of the outer contour at both end portions of the filament are different from those at the remaining central portion of the filament. In this case, it is preferable that the compressive modulus of elasticity at both end portions is rendered to about ½ of that at the central portion.

Figure 6:

FIG. 6 shows the filamentous element composed of a bundle obtained by assembling four single filaments as shown in FIG. 5 together without twisting.

Figure 7:
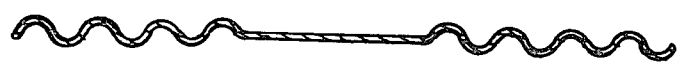

FIG. 7 shows an embodiment of the filamentous element composed of a stranded steel cord having a strand construction of 1×3+5×7+1×0.15 and forming a helix at both end portions thereof. In this case, it is preferable that the compressive modulus of elasticity at both end portions is rendered to about ⅓ of that at the remaining central portion.

Figure 8:

FIG. 8 shows another embodiment of the filamentous element composed of the stranded steel cord having a strand construction of 1×3+5×7+1×0.15 as described above wherein the helix is formed over the whole length of the cord by changing the pitch and average diameter of the outer contour at both end portions and the central portion. In this case, the compressive modulus of elasticity at both end portions is approximately ½ of that at the central portion.

In any case, it is necessary that the portion having a smaller compressive modulus of elasticity in each filamentous element as described above is extended beyond at least 10 mm from the end of the element.

A mechanism usable for forming the helix in the filamentous element will be described below as an embodiment of the invention.

Particularly, it is desirable to use an apparatus as disclosed in U.S. Pat. Nos. 3,700,012 and 3,763,683, an outline of which is described with reference to FIG. 9.

In this case, the following three main steps should be noted for the manufacture of the rubber reinforcing member according to the invention:

1. A step for forming helix in the filamentous element f;

2. A step for forming a band-shaped material T by directly embedding a great number of the filamentous elements f in a rubber or by bundling a great number of the filamentous elements f and then subjecting the bundle to rubber coating; and 3. A step for cutting the band-shaped material T at given size and angle into strips and joining the cut strips with each other.

Figure 9:
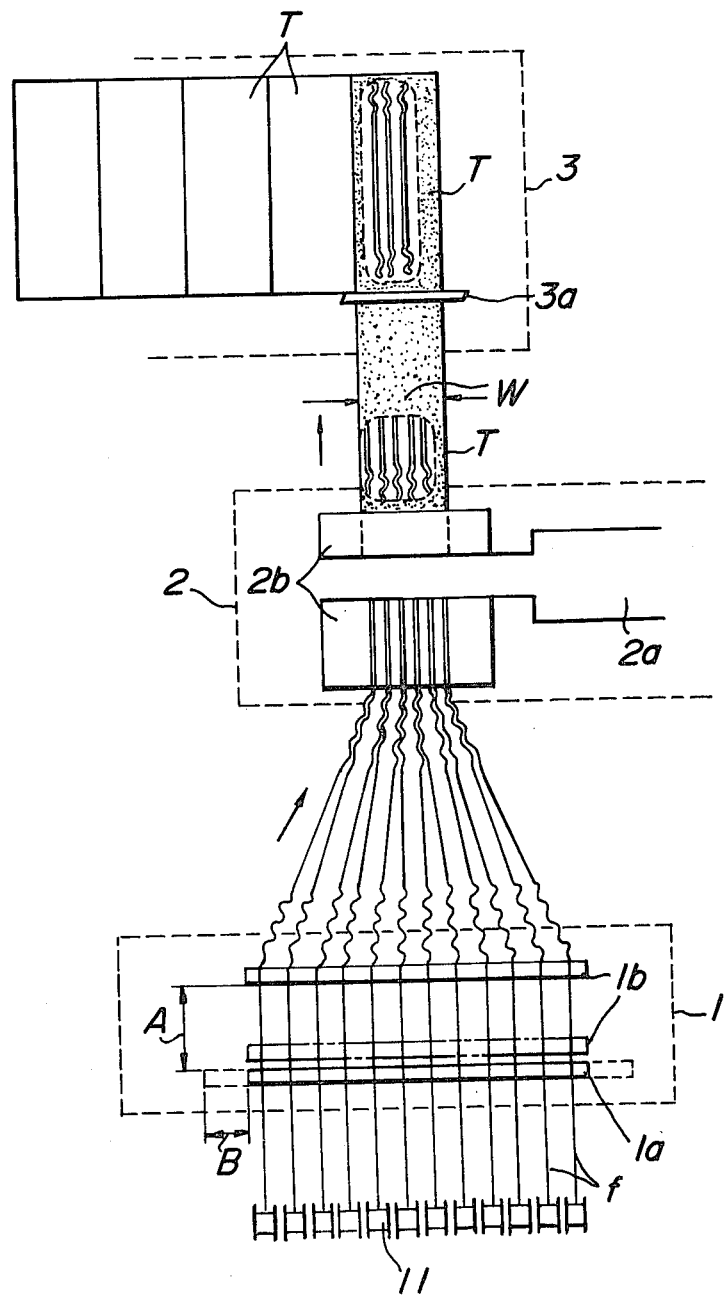
FIG. 9 is a plan view illustrating the production of the rubber reinforcing member according to the invention.

Each of the above steps progresses in a short time with the decrease of the cost. In FIG. 9, reference numeral 1a is a plane plate taking a circle motion with a diameter of 2B without moving toward a horizontal direction and provided with a plurality of holes, through which being passed a great number of the filamentous elements f and reference numeral 1b is a stationary plane plate provided with a plurality of holes for passing the filamentous elements f, which is optionally disposed at a distance A from the plane plate 1a.

By properly determining the dimensions A and B, the shape of the helix and hence the compressive modulus of elasticity at that helical portion can freely be changed. Moreover, when the distance A exceeds a certain limit, even if the radius B becomes larger, it is impossible to form the helix in the filamentous element.

The inventors have found out that the shape of the helix can be changed suddenly or gradually by varying the distance A between the plane plates 1a and 1b with the movement of the plane plate 1b, while forming the helix in the filamentous elements f with the circle motion of the plane plate 1a, during the continuous transportation of the filamentous element from the hole of the plane plate 1a to the hole of the plane plate 1b.

Reference numeral 11 represents a feed reel for element f. The number of the filamentous elements used is properly selected in accordance with the width W of the band-shaped material T to be formed.

The filamentous elements f, each being intermittently formed into helix by means of the plane plates 1a, 1b, are passed through a tube head 2b of a tuber 2a, during which they are subjected to a rubber coating to form a rubberized fabric. Then, the rubberized fabric is cut at a position corresponding to the helical portion by means of a cutter 3a to produce band-shaped materials T as shown in FIGS. 10a and 10b, which are joined with each other on a joint base 3 to form a rubber reinforcing member according to the invention.

Figure 10A:
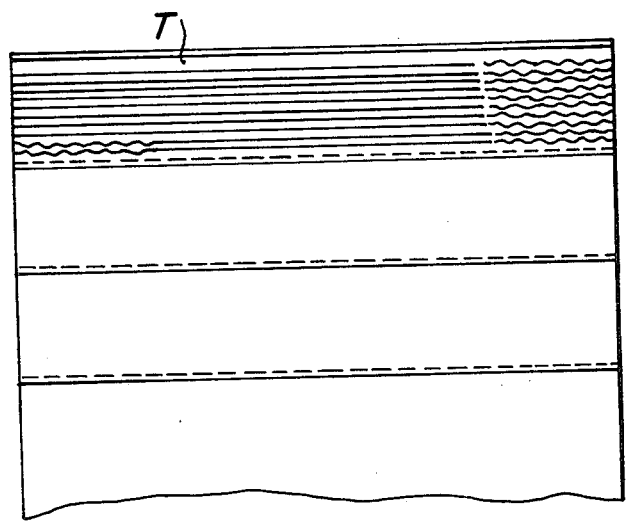
FIGS. 10a and 10b are plan and sectional views of an embodiment utilizing the rubber reinforcing member according to the invention, respectively.
Figure 10B:

The embodiment of FIG. 9 shows the case of cutting the filament elements f at an angle perpendicular to the longitudinal direction of the element f for the production of the band-shaped material T as shown in FIG. 10a. However, cutting at a right angle cannot be applied for the production of rubber reinforcing members having a bias structure as shown in FIG. 11, for example, a reinforcing material for a breaker of a tire.

Figure 11:
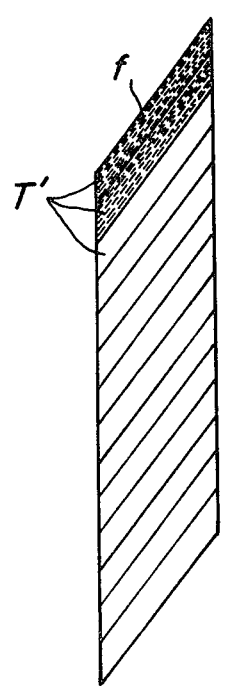

In order to produce the rubber reinforcing member with the bias structure as shown in FIG. 11, the plane plates 1a, 1b and the cutter 3a are inclined at a given angle with respect to the filamentous element f, respectively, whereby band-shaped materials T' in the joint state as shown in FIG. 12a, which are usable as a bias material, can be obtained. In this case, it is preferable that end portions and central portions of all of the filamentous elements are aligned uniformly, but it is necessary to change the positions of the plane plates 1a, 1b for the formation of helix.

Now, the plane plates 1a, 1b are disposed at an angle perpendicular to the feeding direction of the filamentous element as shown in FIG. 9 to ensure the formation of helix, while only the cutter 3a is inclined at a given angle with respect to the feeding direction of the filamentous element, whereby the rubberized fabric can be obliquely cut into band-shaped materials T' in the joint state as shown in FIG. 12b, which are adoptable as a bias structure material. In this case, the width W of the band-shaped material T' is relatively narrowed so as to progressively reduce the stepped difference of the helically formed portion between the adjoining band-shaped materials T', T'. That is, in each of the band-shaped materials T', the length of the helically formed portion at the end of each filamentous element is gradually increased or decreased due to the cutting angle while substantially maintaining the central portions of the elements in an aligned state, so that the stepped difference is produced between the adjoining band-shaped materials T', T' as seen from FIG. 12b. The effect aimed at the invention can be obtained when the minimum length of the helically formed portion at the cut end is at least 10 mm and further such an effect is intended to be substantially uniformized by narrowing the width W of the band-shaped material T'.

As mentioned above, the rubber reinforcing member according to the invention is a rubberized fabric reinforced with the filamentous element, at least one end portion formed into helix and having an axial compression modulus of elasticity smaller than that of the remaining central portion of the element, preferably 1/10 to ⅔ of the axial compression modulus of elasticity at the central portion. The filamentous element includes a single wire filament previously formed into helix on at least one end portion thereof, a bundle obtained by assembling two or more of such wire filaments together without twisting, a bundle obtained by assembling a plurality of straight wire filaments together without twisting and then forming them into helixes, and a stranded cord directly subjected to a formation of helix.

The rubber reinforcing member according to the invention will now be described with reference to practical examples.

Figure 13:
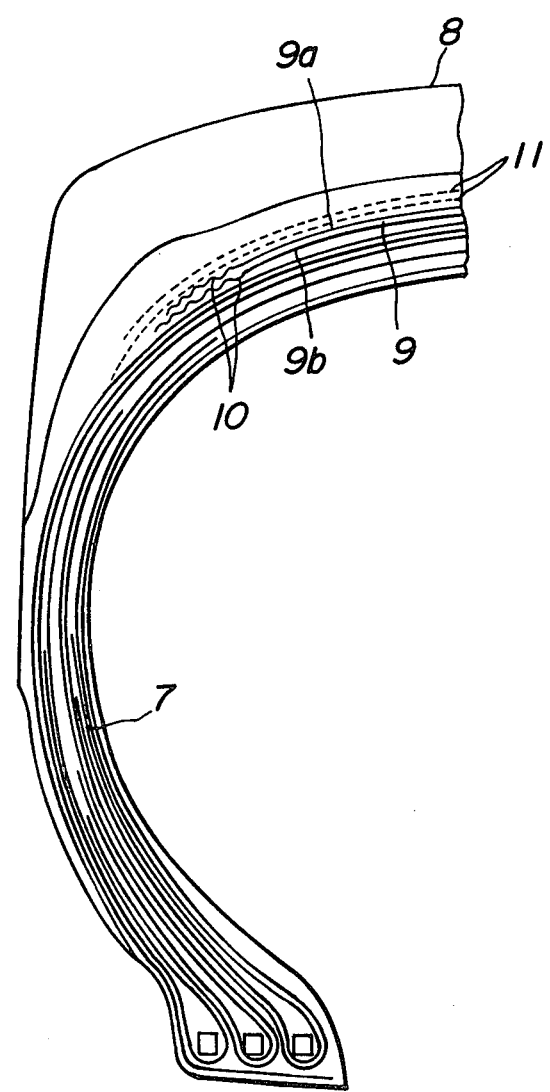
FIGS. 13 and 14 are cross-sectional views showing one half of various embodiments of pneumatic tires utilizing the rubber reinforcing member according to the invention, respectively.

In FIG. 13 is shown a cross section of one-half of a tire, parts being shown in vertical center section through the rotational axis of the tire. The tire of this embodiment is a tire for construction vehicles, first group, ordinary tire extra tread and has a size of 18.00–25 32PR (wherein 32PR indicates the size on the basis of cotton yarn).

In the bias of this embodiment, a carcass ply 7 is composed of 22 plies in total, each ply being composed of nylon cord of 1,260 denier/two strands. The cords of these carcass plies are inclined at an angle of approximately 40° with respect to the circumferential direction of tire as measured at the center of the tire crown portion. In a crown portion 8 of the tire, about the outside of the carcass ply 7 is disposed the rubber reinforcing member containing steel cords according to the invention as a breaker 9.

The breaker 9 is composed of two reinforcing members 9a, 9b. Each of these members is composed of a rubberized tire fabric containing a plurality of filamentous elements, each element being composed of a stranded cord of $1 \times 3 + 5 \times 7 + 0.15$ (the filament diameter is 0.15 mm and the cord diameter is 1.2 mm) and having at both end portions 10 extended to a distance of 40 mm from each of both ends helixes with an average diameter D of the outer contour of 2.4 mm, $D_{max}/D_{min}$ of 1.25, $D/\phi$ of 2.0 and pitch of 10 mm. The number of the filamentous elements per 10 cm is approximately 30 and the inclination angle of the filamentous element is about 40° with respect to the circumferential direction of the tire in the center of the crown portion.

These reinforcing members 9a, 9b are composed of the filamentous element shown in FIG. 7 in which the tensile breaking strength of the steel cord itself is 180 kg/mm². Therefore, the compressive modulus of elasticity of the filamentous element at both end portions 10 is about ¼ of that at the remaining central portion thereof.

Moreover, two additional layers 11, 11 each composed of nylon cords are disposed about the outside of the breaker 9 in the crown portion 8 of the tire.

Figure 14:
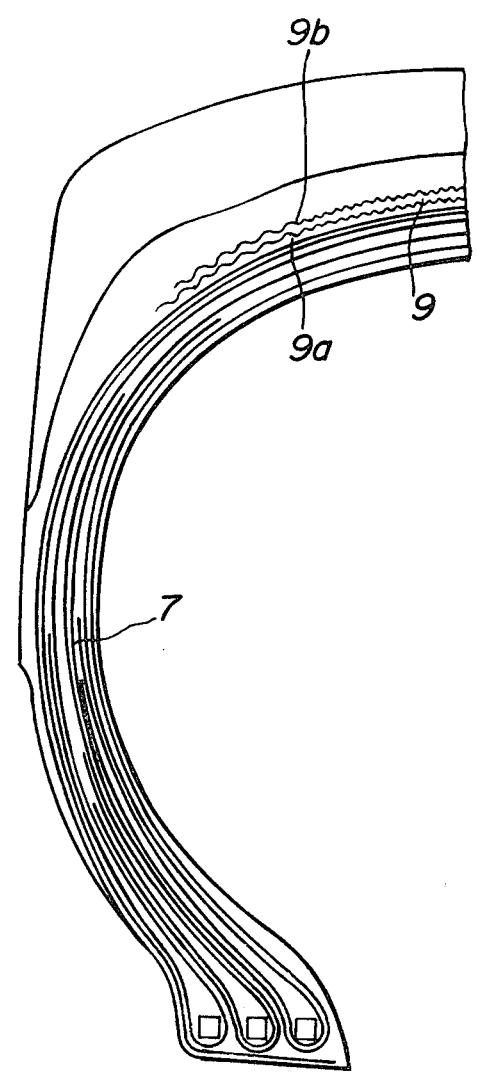

FIG. 14 shows the same bias tire of 18.00–25 32PR as described in FIG. 13 except that the breaker 9 is composed of another reinforcing member according to the invention as mentioned below and the additional layer is not used. In this embodiment, the rubber reinforcing member (9a, 9b) is composed of a rubberized tire fabric containing a plurality of filamentous elements, each element being composed of a non-twisted bundle obtained by assembling 5 steel wires with a filament diameter of 0.25 mm together without twisting and forming helix over its whole length. In this bundle, the helix at the central portion has an average diameter D of an outer contour of 0.95 mm, Dmax/Dmin of 1.25, D/φ of 3.8 and pitch of 5 mm, while the helixes at both end portions (extended to a distance of 40 mm from both ends) have an average diameter D of an outer contour of 1.1 mm, Dmax/Dmin of 1.25, D/φ of 4.4 and pitch of 10 mm. In the tire fabric, the number of the filamentous elements per 10 cm is approximately 32 and the inclination angle of the filamentous element is about 40° with respect to the circumferential direction of the tire in the center of the crown portion. In this reinforcing member, the compressive modulus of elasticity at both end portions is about ½ of that at the remaining central portion.

The above embodiments have been described with reference to the breaker of the bias tires for construction vehicles, but the rubber reinforcing member according to the invention may also be used as a belt, side protect, chafer or the like for radial tires.

The cut failure caused in the crown portion has been prevented by using a material having a strength of at least 140 kg/mm$^2$ as well as a metal as a reinforcing element giving a cut resistant property. However, there is a problem causing the separation to the rubber in the reinforcing element of such material. Therefore, the rubber reinforcing member according to the invention sufficiently develops the effect of preventing the separation frequently caused at the bonding portion of metal or the material similar to the metal with the rubber.

What is claimed is:

1. A rubber reinforcing member comprising; a number of filamentous elements each formed of a metal or a material having a tensile breaking strength of at least 140 kg/mm$^2$ and arranged in parallel with each other, said filamentous elements being embedded in rubber, at least one end portion of the filamentous element is formed into a helix thereby having an axial compression modulus of elasticity smaller than that of the remaining central portion thereof.

2. A rubber reinforcing member as claimed in claim 1, wherein the axial compression modulus of elasticity at the end portion of the filamentous element is 1/10 to ⅔ of that at the central portion thereof.

3. A rubber reinforcing member as claimed in claim 1, wherein the filamentous element is composed of a bundle obtained by assembling a number of filaments together without twisting.

4. A rubber reinforcing member as claimed in claim 1, wherein the filamentous element is composed of a bundle obtained by twisting a number of filaments together.

5. A method of manufacturing a rubber reinforcing member, comprising the steps of:
    (a) intermittently forming a helix in a filamentous element formed of a metal or a material having a tensile breaking strength of at least 140 kg/mm$^2$ and composed of two portions having different axial compression modulus of elasticity while feeding a number of the filamentous elements in a parallel arrangement;
    (b) embedding the filamentous elements in rubber to form a rubberized fabric; and
    (c) cutting the rubberized fabric at a position corresponding to the helical portion of the filamentous element having a smaller compression modulus of elasticity to produce strips of a rubber reinforcing member.

6. A method as claimed in claim 5, wherein a plurality of the filamentous elements are bundled prior to the step (b).

7. A method as claimed in claim 5, wherein a plurality of the filamentous elements are twisted prior to the step (a).

8. A method of manufacturing a rubber reinforcing member, comprising the steps of:
    (a) intermittently forming a helix in a filamentous element formed of a metal or a material having a breaking strength of at least 140 kg/mm$^2$ and composed of two portions having different axial compression modulus of elasticity while feeding a number of the filamentous elements in a parallel arrangement;
    (b) embedding said filamentous elements in rubber to form a rubberized fabric;
    (c) cutting the rubberized fabric at a position corresponding to the helical portion of the filamentous element having a smaller axial compression modulus of elasticity to produce fabric strips; and
    (d) successively joining side edges of the strips with each other after the cut ends of the strips having a smaller axial compression modulus of elasticity are aligned in a line with each other.

9. A method as claimed in claim 8, wherein the width of the rubberized fabric is made relatively narrower at the step (b) and the cutting at the helical portion is carried out at an angle inclined with respect to the longitudinal direction of the filamentous element at the step (c).

* * * * *